United States Patent Office 2,729,630
Patented Jan. 3, 1956

2,729,630

ACID DISAZO DYESTUFFS

Hans Krzikalla, Heidelberg, Tim Toepel, Ludwigshafen (Rhine-Oggersheim), and Bernd Eistert, Ludwigshafen (Rhine), Germany, assignors to Badische Anilin- & Soda-Fabrik Aktiengesellschaft, Ludwigshafen am Rhine, Germany No Drawing. Application October 10, 1951,
Serial No. 250,796

Claims priority, application Germany November 2, 1950

6 Claims. (Cl. 260—155)

This invention relates to new acid disazo dyestuffs.

We have found that valuable acid disazo dyestuffs are obtained by coupling 1 mol of tetrazotised 2.6-diamino-1-chlorobenbene-4-sulphonic acid first in an acid medium with 1 mol of 2-amino-8-hydroxynaphthalene-6-sulphonic acid and then in a weak acid or neutral medium with 1 mol of any other azo component containing at the most one sulphonic acid group. The second azo component may be, for example, 2-hydroxynaphthalene and its 6-sulphonic acid, 1-phenyl-3-methylpyrazolone-(5), 1-(3'-sulphophenyl)-3-methylpyrazolone-(5), 2.4-dihydroxyquinoline or 1.3-diketocyclohexane.

The dyestuffs obtained are especially suitable for dyeing leather and are characterised by good fastness to alkali, acid and light.

The following examples will further illustrate this invention but the invention is not limited to these examples. The parts are by weight.

Example 1

222 parts of 2.6-diamino-1-chlorobenzene-4-sulphonic acid are suspended in 480 parts of concentrated hydrochloric acid and 1300 parts of ice and tetrazotised in the usual way with a solution of 144 parts of sodium nitrite in 100 parts of ice-water.

The solution of the tetrazo compound is stirred at 10° to 15° C. into a solution of 239 parts of 2-amino-8-hydroxynaphthalene-6-sulphonic acid in 1000 parts of water and 100 parts of 40% caustic soda solution. The whole is stirred for about 3 hours until the one-sided coupling to form the monoazo compound is completed.

Meanwhile 144 parts of 2-hydroxynaphthalene are well triturated with 120 parts of 40% caustic soda solution and the mixture brought into solution by the addition of 1000 parts of water. The resulting solution is added to the abovementioned solution of the monoazo compound. It is stirred overnight to complete the coupling.

The disazo dyestuff formed is then precipitated by means of 2000 parts of saturated common salt solution and 1000 parts of solid common salt; it is then filtered off by suction and dried.

1020 parts of a bluish-red disazo dyestuff are obtained which is specially suitable for dyeing leather.

The dyestuff has the formula

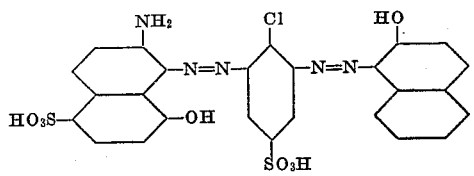

Example 2

11.1 parts of 2.6-diamino-1-chlorobenzene-4-sulphonic acid are tetrazotised as described in Example 1 and the tetrazo compound is coupled with 14 parts of 2-amino-8-hydroxynaphthalene-6-sulphonic acid in an acid medium.

Meanwhile 8 parts of 2.4-dihydroxyquinoline are dissolved in 100 parts of water and this solution is added to the abovementioned solution of the monoazo dyestuff.

After completion of the coupling, the resulting disazo dyestuff is precipitated by means of 250 parts of saturated common salt solution and 150 parts of solid common salt. The whole is heated to 50° C. for half an hour, allowed to cool, the bluish-red dyestuff filtered off by suction and dried. The yield is 110 parts.

The dyestuff has the formula

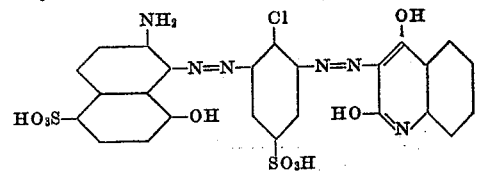

Example 3

11.1 parts of 2.6-diamino-1-chlorobenzene-4-sulphonic acid are tetrazotised as described in Example 1 and the tetrazo compound is coupled with 14 parts of 2-amino-8-hydroxynaphthalene-6-sulphonic acid in an acid medium.

To the resulting coupling product there is added a solution of 8.7 parts of 1-phenyl-3-methylpyrazolone-(5) in 100 parts of water and 5 parts of 40% caustic soda solution.

After coupling is completed, the resulting bluish-red disazo dyestuff is precipitated by the addition of 250 parts of saturated common salt solution and 200 parts of solid common salt, and dried. The yield is 74 parts.

The dyestuff has the formula

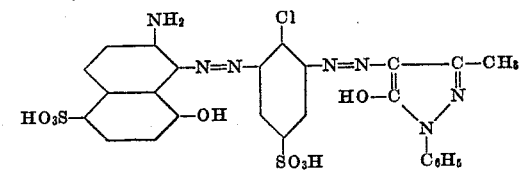

Example 4

Into a solution of the monoazo compound from 11.1 parts of tetrazotised 2.6-diamino-1-chlorobenzene-4-sulphonic acid and 14 parts of 2-amino-8-hydroxynaphthalene-6-sulphonic acid prepared as described in Example 1 there is introduced a solution of 5.6 parts of 1.3-diketocyclohexane in 100 parts of water. The resulting disazo dyestuff is precipitated by the addition of 200 parts of potassium chloride. After drying, 22 parts of a bluish-red dyestuff are obtained.

The dyestuff has the formula

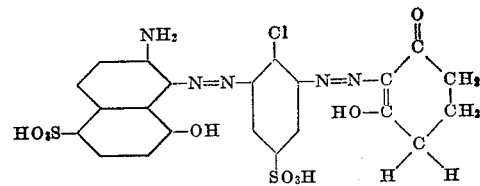

What we claim is:

1. An acid disazo dyestuff of the general formula

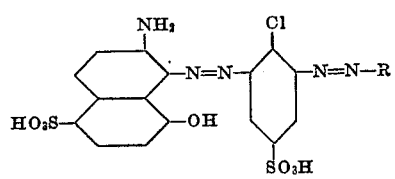

wherein R stands for the radical of a coupling component selected from the group consisting of 2-hydroxynaphthalene and its 6-sulfonic acid, 2.4-dihydroxyquinoline, 1.3- diketocyclohexane and 1-phenyl-3-methylpyrazolone-(5) and its 3'-sulfonic acid.

2. The dyestuff of the formula

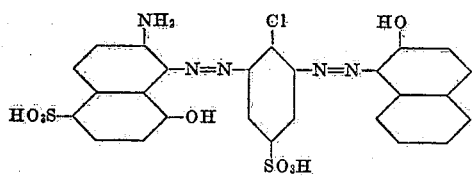

3. The dyestuff of the formula

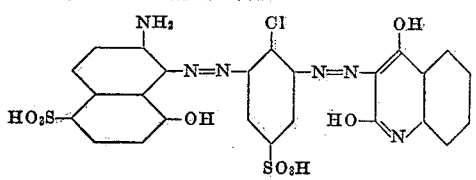

4. The dyestuff of the formula

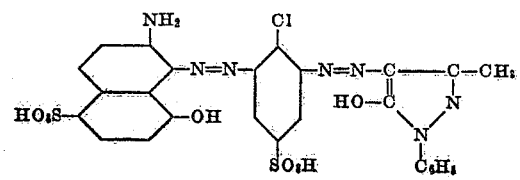

5. The dyestuff of the formula

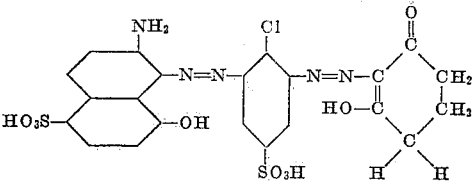

6. A process for the production of acid disazo dyestuffs which comprises coupling 1 mol of tetrazotised 1-chloro-2.6-diamino-benzene-4-sulfonic acid first in an acid medium with 1 mol of 2-amino-8-hydroxynaphthalene-6-sulfonic acid and then in a neutral to weak acid medium with one mol of a coupling component selected from the group consisting of 2-hydroxynaphthalene and its 6-sulfonic acid, 2.4-dihydroxyquinoline, 1.3-diketocyclohexane and 1-phenyl-3-methylpyrazolone-(5) and its 3'-sulfonic acid.

References Cited in the file of this patent

UNITED STATES PATENTS

| 982,508 | Laska | Jan. 24, 1911 |
| 2,116,206 | Krzikalla et al. | May 3, 1938 |

FOREIGN PATENTS

| 16,811 | Great Britain | of 1901 |